United States Patent [19]

van Ee et al.

[11] Patent Number: 4,512,392

[45] Date of Patent: Apr. 23, 1985

[54] HEAT EXCHANGE APPARATUS

[76] Inventors: Dirk van Ee, P.O. Box 2693; Larry J. Benning, P.O. Box 2006, both of Humboldt, Saskatchewan, Canada

[21] Appl. No.: 458,994

[22] Filed: Jan. 18, 1983

[51] Int. Cl.³ .............................................. F28F 3/00
[52] U.S. Cl. .................................... 165/54; 165/166; 165/DIG. 8
[58] Field of Search ................. 165/DIG. 12, 122, 54, 165/57, DIG. 8, 166

[56] References Cited

U.S. PATENT DOCUMENTS

| | | | |
|---|---|---|---|
| 2,869,835 | 1/1959 | Butt | 165/166 |
| 3,239,000 | 3/1966 | Meagher | 165/DIG. 8 |
| 3,666,007 | 5/1972 | Yoshino et al. | 65/DIG. 12 |
| 3,986,549 | 10/1976 | Huggins et al. | 165/DIG. 12 X |
| 4,149,590 | 4/1979 | Ospelt | 165/DIG. 12 X |
| 4,336,748 | 6/1982 | Martin et al. | 98/33 A |
| 4,377,201 | 3/1983 | Kruse et al. | 165/DIG. 12 X |

FOREIGN PATENT DOCUMENTS

| | | | |
|---|---|---|---|
| 470100 | 12/1950 | Canada | 165/DIG. 12 |
| 2556630 | 6/1977 | Fed. Rep. of Germany | 165/DIG. 12 |
| 2338460 | 8/1977 | France | 165/DIG. 12 |
| 53-9036 | 1/1978 | Japan | 165/54 |
| 53-100648 | 9/1978 | Japan | 165/59 |
| 1354502 | 5/1974 | United Kingdom | 165/DIG. 8 |

Primary Examiner—Michael Koczo
Attorney, Agent, or Firm—Stanley G. Ade

[57] ABSTRACT

A heat exchange apparatus comprises a plastics outer casing for mounting in the exterior wall of a building such that it extends outwardly of the building wall to define an inlet and an outlet spaced from the wall. A heat exchange block is mounted within the outer casing and defines two paths of air therethrough mutually at right angles and both inclined to the horizontal. The block is formed of a plurality of polypropylene extruded sheets (preferably Coroplast) which comprises two thin sheets supported by a plurality of cells passing along the sheets. The Coroplast sheets are separated by spaces to form elongated air channels. The block is supported within the outer casing on resilient mountings and is arranged such that the air exhausted from the building passes through the elongated channels. A fan drawing air into the building from the exterior through the heat exchange block includes a nozzle for directing the air into the building away from the outlet. The fan can be reversed periodically so that both fans act to draw warm air out from the building through the block to melt any frost forming within the block.

3 Claims, 5 Drawing Figures

HEAT EXCHANGE APPARATUS

BACKGROUND OF THE INVENTION

This invention relates to heat exchange apparatus and particularly such apparatus useful for ventilation air exchange in buildings.

It is well known to provide heat exchangers which allow heated air to be drawn from a room or building for exhaust to the exterior and to pass the air through a heat exchange block which defines a second path for incoming air whereby the outgoing air warms the incoming air to avoid undue heat loss from the building. The heat exchange block provides a plurality of layers or sheets of material which act to separate the two flows of air which provide the necessary heat exchange.

A number of problems exist with this type of unit, particularly when used for ventilation for a building used in livestock confinement. In fall and in winter, such a building is characterized by moderate temperature (60° F. to 70° F.) and high humidity. The temperature is achieved and maintained both biologically (through metabolism of feed) and by mechanical heat sources. The high humidity is the direct result of animal metabolism, density of confinement and evaporation of wastes. The humidity is highly corrosive in some types of livestock confinement operations and oxygen consumption in such environments is very high. Therefore, the primary environment management problem in livestock confinement operations has been meeting the high required rates of ventilation for oxygen replenishment and de-humidification while not giving up the moderate temperature conditions and while minimizing the cost of fuels necessary to maintain the temperature conditions.

Traditionally, confinement livestock operators have had two responses to these thermally contradictory circumstances, either they shut down for the coldest part of the year or they ventilate and heat at the same time at a great cost. There has been therefore a substantial need for a cheap, simple and efficient air-to-air heat exchanger to overcome this problem. The heat exchanger, operating across a temperature spread of as much as 100° F. and very high humidity differentials must achieve efficiencies of heat transfer as much as 60% to 90%. At lower efficiencies, significant temperature drops in the barn may be experienced. At these higher efficiencies, the amount of heat recovered from the outgoing air is sufficient that it tends to cause freezing in the exhaust part of the exchanger. There has been a need therefore to include a defrosting mechanism which enables the use of the higher efficiencies which are necessary to maintain the temperature within the barn.

A further problem particularly relevant to the above conditions is the very high corrosiveness of the exhausted gases. This corrosiveness can have very serious effects upon any metal parts within the heat exchanger.

A yet further problem is that the incoming air must be circulated or distributed within the room, particularly bearing in mind the high density of confinement and the high requirement for oxygen caused thereby. It is possible to provide such distribution of the air by additional duct work within the building but this substantially increases cost and complexity, bearing in mind that many buildings may be of a structure not suitable to receive such duct work.

SUMMARY OF THE INVENTION

It is one object of the invention therefore to provide a heat exchange apparatus which is suitable for use in the difficult area of livestock confinement buildings. According to a first aspect of the invention therefore there is provided a heat exchange apparatus comprising an outside casing, means defining in the casing a first inlet, a first outlet, a second inlet and a second outlet, means for mounting the outside casing relative to an outside wall of a building such that the first inlet and the second outlet are arranged on one side of the wall facing within the building and the first outlet and the second inlet are arranged on the other side of the wall facing outside the building, a heat exchange block defining therethrough two separate air paths mutually at right angles, means mounting the block in the casing such that air can pass in a first and a second separate path respectively from said first inlet through said block to said first outlet and from said second inlet through said block to said second outlet, a first fan for pumping air in said first path, a second fan for pumping air in said second path and means for reversing the flow of air in said second path while maintaining unchanged the flow of air in said first path.

It is one advantage of this invention therefore that the heat exchange apparatus can be defrosted very rapidly by reversing the flow of air in the second path so that both flows of air act to withdraw warm air from the building. Thus, ice formed on the heat exchange block is rapidly melted and acts to wash the heat exchange block free from any contamination.

It is a further advantage of the invention that the heat exchange block is arranged at an angle so that the liquid can run readily from the block into the outside casing.

It is a yet further advantage of the invention that the outside casing includes the first outlet at a position adjacent the bottom of the casing so that the liquid running from the heat exchange block can readily leave the outside casing through the first outlet at a position remote from the wall of the building.

According to a second aspect of the invention there is provided a heat exchange apparatus comprising an outside casing, means defining in the casing a first inlet, a first outlet, a second inlet and a second outlet, means for mounting the outside casing relative to an outside wall of a building such that the first inlet and the second outlet are arranged on one side of the wall facing within the building and the first outlet and the second inlet are arranged on the other side of the wall facing outside the building, a heat exchange block defining therethrough two separate air paths mutually at right angles, means mounting the block in the casing such that air can pass in a first and a second separate path respectively from said first inlet through said block to said first outlet and from said second inlet through said block to said second outlet, a first fan for pumping air in said first path and a second fan for pumping air in said second path, the second outlet including nozzle means arranged such that air emitted by said second outlet is directed away from the first inlet.

It is a yet further advantage of the invention that the nozzle directs the incoming air away from the outgoing air to ensure that the outgoing air comprises completely stale air and does not include any of the fresh air which is being drawn in by the apparatus. In addition, the nozzle is arranged to eject the air into the building at a sufficient speed to provide distribution of the air within the building thus avoiding the necessity of additional duct work.

According to a third aspect of the invention there is provided a heat exchange apparatus comprising an outside casing means defining in the casing a first inlet, a first outlet, a second inlet and a second outlet, means for mounting the outside casing relative to an outside wall of a building such that the first inlet and the second outlet are arranged on one side of the wall facing within the building and the first outlet and the second inlet are arranged on the other side of the wall facing outside the building, a heat exchange block defining therethrough two separate air paths mutually at right angles, means mounting the block in the casing such that air can pass in a first and a second separate path respectively from said first inlet through said block to said first outlet and from said second inlet through said block to said second outlet, a first fan for pumping air in said first path and a second fan for pumping air in said second path, said heat exchange block comprising a plurality of thin sheets of plastics material lying in planes parallel to the first and second flows and arranged so as to divide the first and second flows into a plurality of alternate portions separated by the sheets, a plurality of elongated spacer strips arranged to support and space each sheet on one side thereof relative to the adjacent sheet on that side, the strips being parallel to the air flow on the respective side and spaced by a distance of the order of the spacing between the sheet and the adjacent sheet and a second plurality of elongated spacer strips on the other side of each sheet and arranged parallel to the air flow on the respective side of the sheet and spaced so as to support said sheet only occasionally.

It is a yet further advantage of the invention that the heat exchange block is formed of plastics material without any metal parts and hence is fully resistant to the corrosiveness of the outgoing gases.

It is a yet further advantage of the invention that the heat exchange block is formed of commercially available plastics sheet provided as a polypropylene extrusion which can be separated by spacer strips so that the path for the outgoing air is substantially free of spacer strips to avoid contamination while the individual sheets which separate the two paths of air can be very thin thus providing good heat exchange contact.

It is a still further advantage of the invention that the heat exchange block can be readily mounted within a plastic outer casing by resilient mounting means thus avoiding damage to the heat exchange block from vibration caused by the fans.

With the foregoing in view, and other advantages as will become apparent to those skilled in the art to which this invention relates as this specification proceeds, the invention is herein described by reference to the accompanying drawings forming a part hereof, which includes a description of the best mode known to the applicants and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
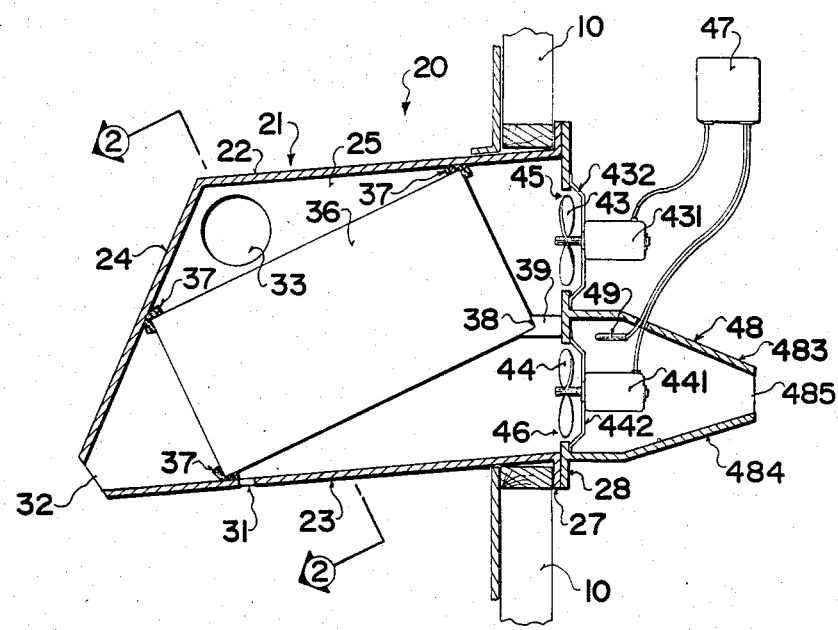
FIG. 1 is a cross sectional view of a heat exchange apparatus according to the invention.
Figure 2:
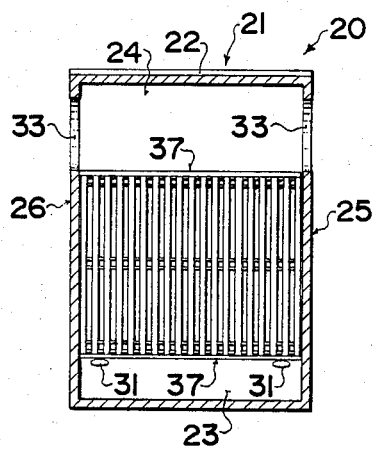
FIG. 2 is a cross sectional view along the line 2—2 of the apparatus of FIG. 1.
Figure 3:
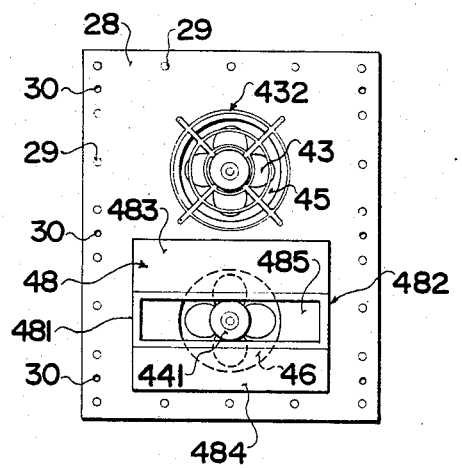
FIG. 3 is a front elevational view of the apparatus of FIG. 1.

The heat exchange apparatus is shown in detail in FIGS. 1, 2 and 3 mounted in a wall 10 comprising the exterior wall of a livestock confining building. The heat exchange apparatus is generally indicated at 20 and comprises an outside casing 21 providing a generally rectangular main body having upper and lower walls 22, 23, an outer depending wall 24 and sides 25, 26, only the former of which is visible in FIG. 1. An open front portion of the main body of the outside casing 21 includes a surrounding flange 27 for coupling with a front plate 28 by suitable pop rivets 29 as shown in FIG. 3.

The flange 27 and the outer portion of the front face 28 provide a supporting flange whereby the heat exchange apparatus can be secured to the wall. Specifically, an opening is provided in the exterior wall of the building of the correct size to receive the body of the heat exchange apparatus with the flange abutting the face of the wall around the outside of the opening. The heat exchanger is then secured to the wall by screws passing through openings 30 provided through the flange 27 and the front face 28 and passing into the wall. In this way, the front face 28 is substantially flush with the wall and the main body of the heat exchanger extends out through the wall to avoid taking up space inside the building.

The main body 21 comprises rotational molded polyethylene and thus is formed as a single piece without seams. The upper wall 22 is inclined slightly from the horizontal and lies parallel to the lower wall 23 which is similarly inclined so that any liquid within the outer casing either drawn in by the air or condensed from the air can leave the casing by running along the lower wall 23 to an outlet nozzle 32 or to a drain hole 31. The outlet nozzle 32 comprises a slot extending across the full width of the heat exchanger and defined at the junction between the wall 23 and the end wall 24 which extends downwardly and outwardly from the upper wall 22 towards the lower wall 23. A second air inlet 33 is provided in each of the side walls 25, 26 of the main body 21 as a circular opening adjacent the walls 22, 24. Thus, the second inlet 33 is arranged at right angles to the first outlet 32.

Each of the walls 22, 23, 24 includes a notch (not shown) extending across its width on the interior thereof. As the wall thickness is constant, this shows as a small ridge on the outside of the heat exchanger. The notches, if provided, are arranged at suitable position to receive the three edges of a rectangular heat exchange block 36. Each of the three edges includes a strip 37 of foam rubber which is secured to the edge of the block 36 by adhesive and is located by the notch. As shown in FIG. 2, the width of the heat exchange block 36 is the same as that of the outside casing and hence the sides of the block lie closely adjacent or in contact with the sides 25, 26 of the main body 21. The fourth edge of the block 36 shown at 38 is supported relative to the main body 21 by a plastic strip 39 which is secured at its ends to the sides 25, 26 by suitable screws. Thus, it will be appreciated that in manufacture with the strip 39 not yet in place, the block 36 can be readily inserted into the main body 21 to a position where the edges carrying the foam strips 37 engage the notches following which the strip 39 is positioned to locate the block 36 in place. The block 36 is thus mounted within the main body 21 in a resilient manner which avoids the communication of any vibration of the main body 21 to the heat exchange block 36.

Figure 4:
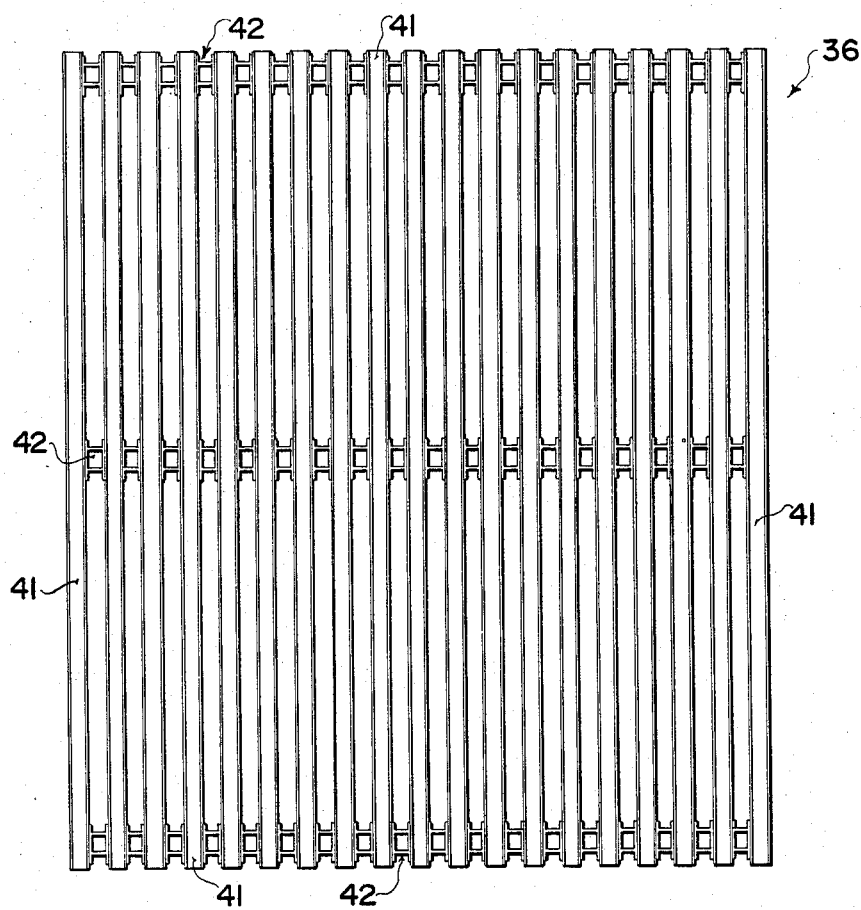
FIG. 4 is an enlarged end view of the embodiment of FIG. 1 showing the interior of the heat exchange block.
Figure 5:
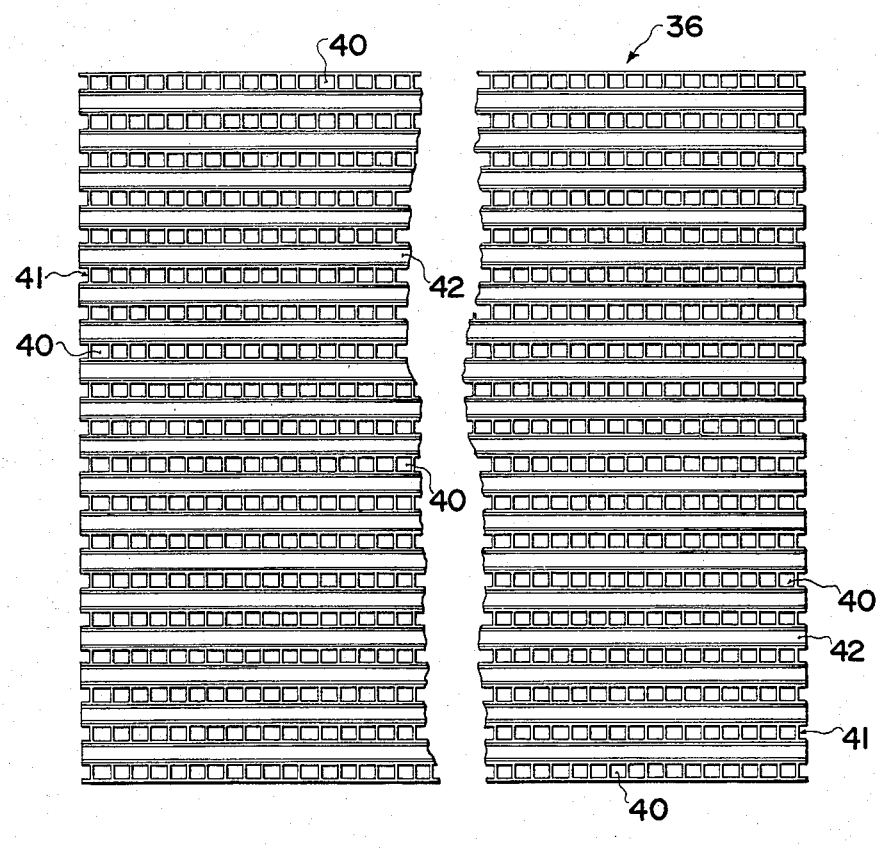
FIG. 5 is an enlarged end view of the embodiment of FIG. 1 showing the heat exchange block from the other direction.

Turning now to FIGS. 4 and 5, the heat exchange block 36 comprises a large number of sheets of Coroplast (registered trade mark) arranged in parallel relation. Coroplast is a commercially available polypropylene extrusion comprising two parallel sheets separated by a plurality of parallel spacer strips running along the length of the sheets. The spacing between the strips is of the order of the spacing between the sheets so as to form a large number of square cells across the sheet. The edge of each sheet of Coroplast is shown in FIG. 5 where the cells are readily visible and are shown at 40.

In FIG. 4, the side of each of the sheets can be seen at 41 and it will be appreciated that the portion visible in FIG. 4 is that of the side of the endmost spacer strip together with the edges of the individual sheets making up the Coroplast sheet.

Each of the Coroplast sheets is separated from the next adjacent Coroplast sheet by a plurality of spacers of which three are shown in FIG. 4. Each spacer indicated at 42 comprises a narrow strip of Coroplast consisting of two or three cells defined by short widths of the sheet attached by two or three of the spacers.

In manufacture, the polypropylene extrusion comes in large sheets which are firstly cut to size. Subsequently, the heat exchange blocks are built up by glueing to a first cut sheet, three spacer strips 42. Next a second sheet of the extrusion is glued upon the spacer strips and in a similar manner, the whole heat exchange block is built up. In one example, there are thirty-eight sheets of the polypropylene extrusion with a similar number of separating channels defined by the spacers 42. The number of spacers 42 used in each channel is dependent upon the size of the sheets and is sufficient merely to provide adequate support of the sheets to define the channels therebetween. It may in fact only be necessary to provide spacers at either end of the sheets.

It will be appreciated therefore that the heat exchange block provides two separate air paths through the block mutually at right angles. The first path can be seen from FIG. 5 where the air can pass through the polypropylene extrusions and specifically through each of the cells defined thereby. The second path is shown in FIG. 4 and is formed by the channels between each of the extrusions and defined by the spacers 42. Thus, the air paths are separated into a plurality of alternate layers separated only by the thin surface sheets of the extrusions. As the thin surface sheets are supported closely by the spacer strips shown in FIG. 5, the surface sheets themselves can be very thin since they need little strength. However, in the other direction shown in FIG. 4, very few spacers are needed since each extrusion is itself relatively strong in view of the large number of cells formed.

Referring again to FIG. 1, it will be noted that the heat exchange block 36 acts to divide the main body 21 into four separate sections. The first section lies adjacent the outlet nozzle 32 and communicates with one side of the block 36. A second section lies adjacent the second inlet 33. The opposite end of the block 36 from the outlet 32 defines a third section of the main body 21 and similarly, the opposite end of the block 36 from the second inlet 33 defines the fourth section. The third section is separated from the fourth section by the strip 39.

The third section communicates with a circular opening 45 defined in the front face 28 and providing an inlet for air exiting from the interior of the building. Within the opening 45 is provided a fan 43 of conventional construction comprising a motor 431 and a supporting grid 432 by which it is secured to the front face 28. The fourth section is connected to a circular opening 46 also provided in the front sheet 28 in which a fan 44 is similarly mounted including a motor 441 and a supporting grid 442.

A control device 47 supplied with electrical power from the building acts to drive the fan 43 in a direction to pump air from the interior of the building through the first inlet defined by the opening 45, through the heat exchange block 36 and out through the first outlet 32. It will be noted from FIG. 4 that the path that the air takes from the building to the exterior through the heat exchange block 36 passes through the channels defined between the extrusions and hence through long unobstructed passages with spaces provided only infrequently. Thus the channels are relatively open to resist the deposit of contaminants from the air and liquid condensing from the air. In addition, the relatively long channels are easy to clean by removal of the fan 43 following which water can be injected into the heat exchanger along the normal path of air to wash the path free from the contaminants which have collected.

The control device 47 acts to drive the fan 44 normally in a direction to draw air through the heat exchange block from the second inlet 33 and to direct it into the interior of the building. Since the air coming from the outside of the building is relatively clean and free from moisture, it is less prone to deposit liquid and contaminants within the heat exchange block and hence the small cells supporting the extrusions are less likely to become contaminated.

A nozzle device 48 and shown in FIGS. 1 and 3 is mounted over the fan 44 and is secured to the front face 28 by suitable means not shown. The nozzle comprises sides 481, 482 and upper and lower walls 483, 484. The upper and lower walls include portions which converge toward a narrow elongate slot 485 defining a nozzle through which the whole of the air coming into the building passes. Thus the air is accelerated to a high speed of the order of 2000 ft/min. In this way the air is directed away from the outgoing air drawn by the fan 43 to avoid fresh air being drawn back out by the fan 43 and in addition the high speed of the air acts to distribute the air through the building without the necessity of additional duct work. It will also be noted that the nozzle 32 is directed away from the inlet 33 so that stale contaminated air is not drawn in through the inlet 33. Particularly, the inlet 33 is arranged at right angles to the nozzle 32 and also at right angles to the upper surface of the main body 21 thus avoiding the ingress of rain or snow. Furthermore, the majority of the heat exchanger lies outside the building whereby the nozzle 32 lies a considerable distance from the wall 10 of the building so that any liquid running from the nozzle falls to the ground well away from the building and away from the foundation.

After a period of time dependent upon the efficiency of the heat exchange block and the relative temperatures inside and outside the building, frost develops on the heat exchange block within the path of air exiting from the building and mainly, adjacent the outlet 32. If this frost is allowed to continue to develop and to accummulate the dust and contaminants carried by the air stream, it will eventually seal off the heat exchange block and prevent the further outflow of the stale air. When this occurs or as the condition is developing, the amount of heat introduced into the air drawn into the building gradually reduces. A temperature sensor 49 provided within the nozzle 48 acts to continually measure the temperature of the incoming air. When the temperature reaches a predetermined low as set upon and determined by the control device 47, the control device 47 acts to reverse the polarity of the motor 441 whereby the direction of the fan 44 is reversed to draw air from the interior of the building out through the heat exchange block to exit through the inlet 33. Thus both the fans 43 and 44 are acting during this period to draw air out of the building through the heat exchange block so that the warm air in both air flow paths acts to rapidly melt any frost from the walls of the heat exchange block 36 whereupon the frost and melted liquid can drop from the block into the outside casing adjacent the nozzle 32. The control device 47 is arranged to control the reversal of the fan 44 for a pre-determined time period following which the fan is reverted to its normal direction to continue normal operation of the heat exchange apparatus.

In an alternative arrangement, the temperature sensor 49 is omitted and the control device 47 acts to time both the period of normal running and the period of reverse. The former can be set to accomodate different conditions, but in practice a reverse period of 8 minutes in every hour has been found to be satisfactory.

In view of the fact that the frost forms in the unobstructed channels of the heat exchange block, the fact that the heat exchange block is inclined so that the flow of air is inclined to the horizontal, the fact that the plates of the heat exchange block are arranged in vertical planes, and the fact that both air channels are used to transport warm air, the developed frost is very rapidly ejected from the heat exchange block either in the form of liquid or as ice for later ejection through the nozzle 32.

As the whole apparatus excluding the fans and their associated motors is manufactured of plastic material, problems of corrosion do not occur. The heat exchange block provides a very high efficiency in view of the very thin sheets separating the two paths of air. In addition the resilient mounting of the block within the outer casing avoids any damage to the delicate separating sheets caused by the continual vibration of the fans 43 and 44.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention:

1. Heat exchange apparatus comprising an outside casing, means defining in the casing a first inlet, a first outlet, a second inlet and a second outlet, means for mounting the outside casing relative to an outside wall of a building such that the first inlet and the second outlet are arranged on one side of the wall facing within the building and the first outlet and the second inlet are arranged on the other side of the wall facing outside the building, a heat exchange block defining therethrough two separate air paths mutually at right angles, means mounting the block in the casing such that air can pass in a first and a second separate path respectively from said first inlet through said block to said first outlet and from said second inlet through said block to said second outlet, a first fan for pumping air in said first path and a second fan for pumping air in said second path, said heat exchange block comprising a plurality of thin sheets of plastics material lying in planes parallel to the first and second flows and arranged so as to divide the first and second flows into a plurality of alternate portions separated by the sheets, a plurality of elongated parallel spacer strips arranged to support and space each sheet on one side thereof relative to the adjacent sheet on that side, each spacer strip being at right angles to the sheets and extending from one edge thereof to an opposing edge, the strips being parallel to the second air path as it passes through the block and spaced by a distance of the order of the spacing between the sheet and the adjacent sheet each sheet, its respective adjacent sheet and the plurality of spacer strips being formed integrally from a plastics extrusion, and a plurality of elongated spacer members on the other side of each sheet and arranged parallel to the first air path as it passes through the block and spaced so as to support said sheet at positions including opposed edges thereof spaced widely relative to said spacing between the sheet and the next adjacent sheet, each member being formed from a strip of said plastics extrusion.

2. Apparatus according to claim 1 wherein each sheet, its respective adjacent sheet and the first plurality of spacer strips are formed integrally from a polypropylene extrusion.

3. Apparatus according to claim 2 wherein the polypropylene extrusion is Coroplast.

* * * * *